April 7, 1959  H. E. CHISHOLM ET AL  2,881,001
ENTERTAINMENT AND EDUCATIONAL ATTACHMENT FOR A PHONOGRAPH
Filed Nov. 23, 1956  2 Sheets-Sheet 1
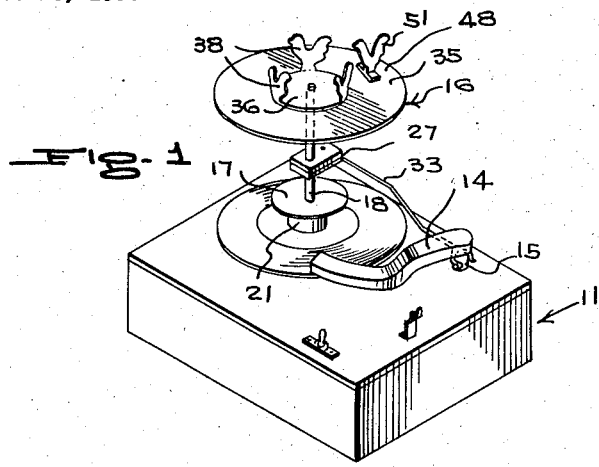
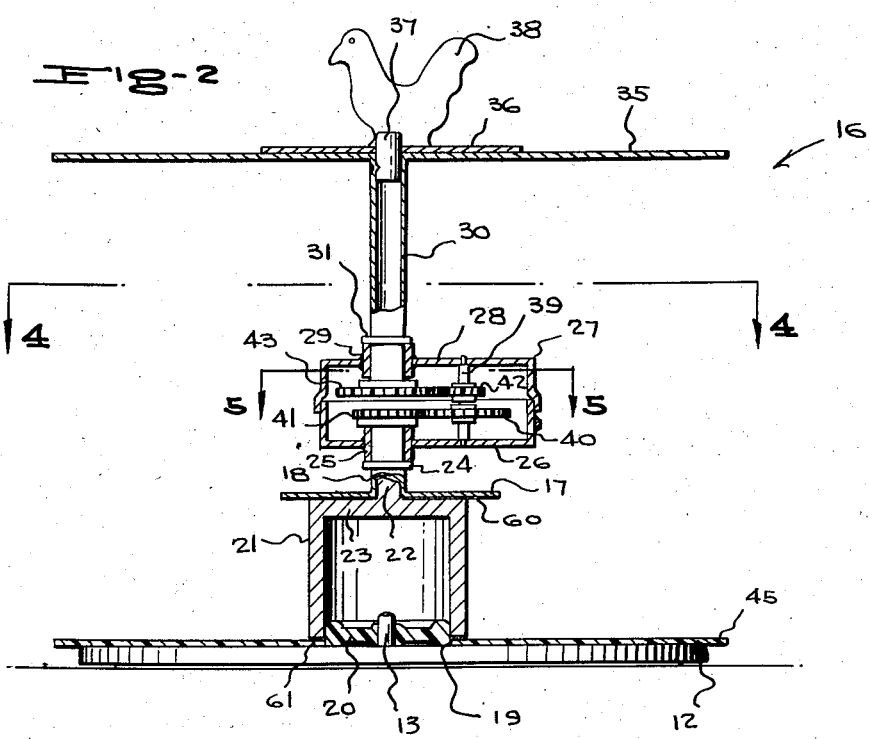
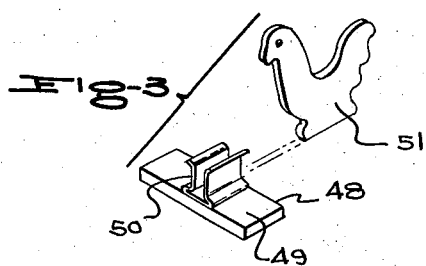
INVENTOR.
MATTIE L. CHISHOLM,
HURLEY E. CHISHOLM
BY
McMorrow, Berman & Davidson
ATTORNEYS

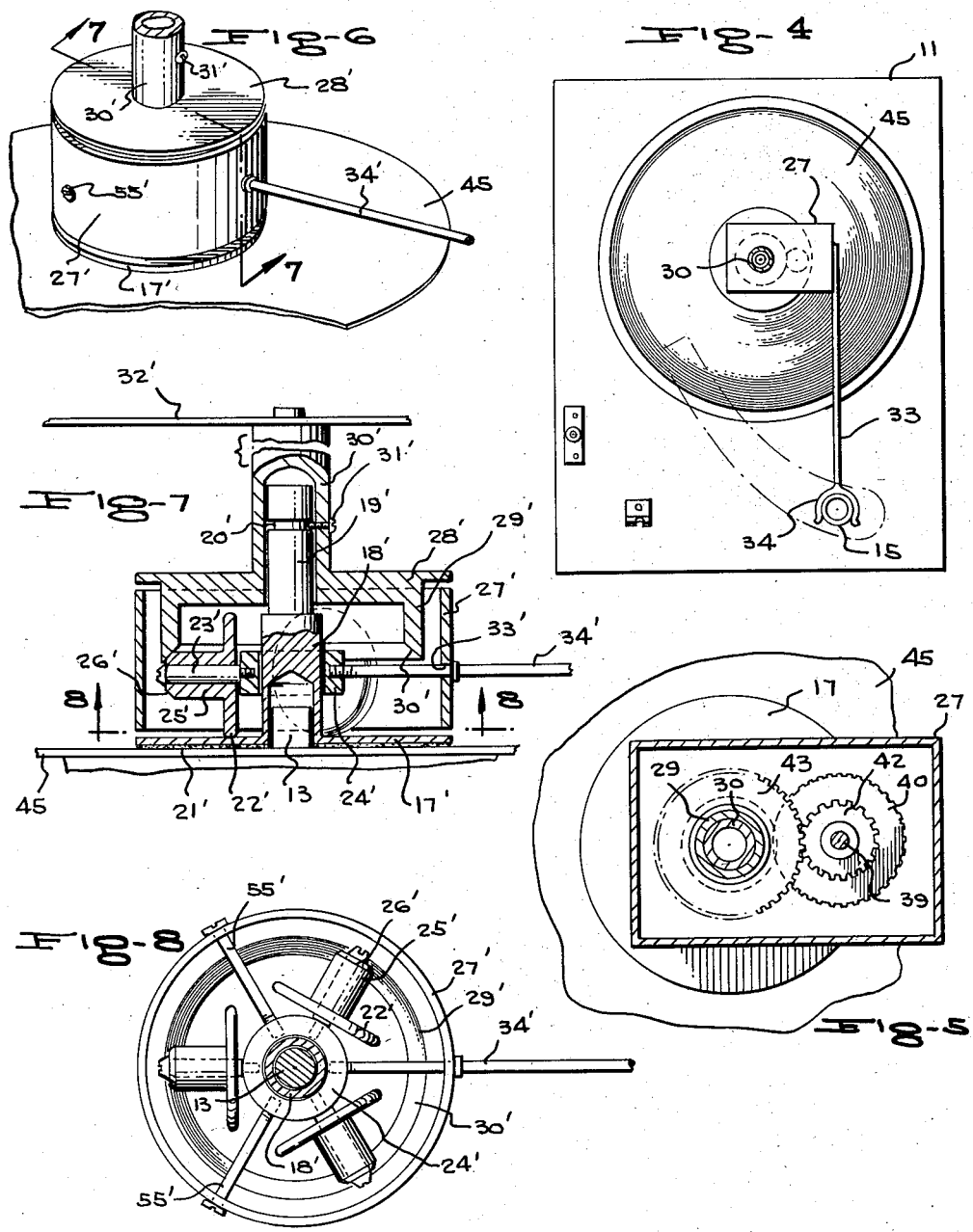

tubular sleeve element 18 formed integrally therewith and adapted to normally receive the upstanding disc centering spindle of a phonograph turntable.

As shown in Figure 2, in the case of records of the type having a relatively large central opening 19, the records are centered by being engaged around a circular adapter 20 having a central opening formed to receive the phonograph spindle 13. While the circular base member 17 of attachment 16 is normally intended to engage the top surface of a phonograph record adjacent the centering spindle of the phonograph, in the case of the so-called "45 r.p.m." discs having enlarged openings 19, a cylindrical adapter cup 21 is employed, said cup 21 having an inside diameter sufficient to engage over a conventional adapter 20, as shown in Figure 2, and being formed in its top wall with an upstanding pivot lug 22 vertically aligned with and substantially similar in diameter to the centering post 13 of the phonograph turntable 12. Under these circumstances, the circular base member 17 rests on the circular top wall, shown at 23, of the adapter cup member 21.

The bottom surfaces of members 17 and 21 are provided with coatings of friction material, shown respectively at 60 and 61.

The vertical sleeve 18 is formed with an annular supporting rib 24 on which is engaged the cylindrical supporting sleeve element 25 of the bottom wall 26 of a housing 27. The top wall, shown at 28, of said housing is formed with a vertical sleeve 29, vertically aligned with the sleeve 25 and rotatably receiving an upstanding vertical, tubular spindle 30, said spindle being formed with an annular supporting rib 31 which rotatably engages the top rim of sleeve 29, whereby the spindle 30 is freely rotatable on said top rim. Similarly, the bottom rim of sleeve 25 rotatably engages the rib 24, whereby housing 27 is freely rotatable with respect to the base member 17.

As shown in Figure 4, the housing 27 is generally rectangular in shape and has secured rigidly to the rear wall thereof an outwardly projecting rod member 33 formed at its outer end with a U-shaped spring clip 34 arranged to clampingly engage the phonograph arm pivot post 15, to hold housing 27 stationary while the turntable 12 rotates.

Integrally formed or otherwise rigidly secured to the top end of the spindle 30 is a generally circular platform 35 of any suitable rigid material, preferably magnetic sheet metal material, such as sheet steel. Designated at 36 is a circular support to which is centrally secured a vertical pin element 37 which engages in and is non-rotatively secured to the top portion of the tubular spindle 30. The disc 36 is formed at its periphery with a plurality of upstanding toy figures 38 which rotate with platform 35 and spindle 30. The figures 38 may be suitably decorated to simulate animals or other toy figures of interest to children.

Journalled vertically in the housing 27 is a shaft 39 having secured to the lower portion thereof a relatively large gear 40 which meshes with a relatively small gear 41 secured to the top end of the vertical shaft element 18. Secured on shaft 39 is a relatively small gear 42 which meshes with a relatively large gear 43 secured to the bottom end of spindle 30. Thus, rotation of base member 17, resulting from the rotation of turntable 12 and the record disc, shown at 45, which is engaged by the bottom rim of the adapter cup 21, is transmitted through the gears 41, 40, 42 and 43 to shaft 30, and thence to disc 36 and platform 35, causing disc 36 and platform 35 to rotate, at a relatively reduced rate of speed, simultaneously with the rotation of the record disc 45.

Suitable toy figures may be supported on the outer portions of the platform 35, for example, by means of

---

2,881,001
Patented Apr. 7, 1959

2,881,001

ENTERTAINMENT AND EDUCATIONAL ATTACHMENT FOR A PHONOGRAPH

Hurley E. Chisholm, Miami, and Mattie L. Chisholm, New Smyrna Beach, Fla.

Application November 23, 1956, Serial No. 623,885

1 Claim. (Cl. 272—31)

This invention relates to entertainment devices, and more particularly to an improved educational and entertainment device for use on a phonograph and being especially adapted to provide visual entertainment for children while playing phonograph records.

A main object of the invention is to provide a novel and improved entertainment and educational attachment for a phonograph of the type having a rotatable turntable provided with a disc centering spindle and a phonograph arm, the device being simple in construction, being easy to mount on a conventional phonograph, and being provided with a means for supporting a variable arrangement of toy figures theron.

A further object of the invention is to provide an improved entertainment and educational attachment for a conventional disc phonograph, said attachment being inexpensive to manufacture, being durable in construction, and serving as a medium for stimulating the imagination of a child watching same while a phonograph record is being played.

Further objects and advantages of the invention will become apparent from the following description and claim, and from the accompanying drawings, wherein:

Figure 1 is a perspective view of a conventional phonograph provided with an improved entertainment and educational attachment in accordance with the present invention.

Figure 2 is an enlarged transverse vertical cross sectional view taken through the entertainment and educational attachment of Figure 1, showing the phonograph record in transverse cross section and the turntable supporting the record in side elevational view.

Figure 3 is an enlarged perspective view illustrating a mounting device for supportig a changeable toy figure on the top platform of the entertainment and educational attachment of Figures 1 and 2.

Figure 4 is a horizontal cross sectional view of the attachment of Figures 1 and 2, taken on line 4—4 of Figure 2, but being drawn to a reduced scale.

Figure 5 is an enlarged horizontal cross sectional view taken on the line 5—5 of Figure 2.

Figure 6 is a fragmentary perspective view of a modified form of entertainment and educational attachment for a phonograph, in accordance with the present invention.

Figure 7 is an enlarged vertical cross sectional view taken on the line 7—7 of Figure 6.

Figure 8 is a horizontal cross sectional view taken substantially on the line 8—8 of Figure 7.

Referring to the drawings, and more particularly to Figures 1 to 5, 11 generally designates a conventional phonograph of the type having a rotatable turntable 12 provided with a disc centering spindle 13 and a phonograph arm 14 pivotally mounted on a pivot post 15 spaced laterally from the turntable 12. Designated generally at 16 is an entertainment and educational attachment for said phonograph, the attachment comprising a circular base member 17 having a central, upstanding a support member 48 having a magnetized base 49 and an upstanding resilient clamping channel 50 mounted thereon, as shown in Figure 3. The base member 49 is placed on the platform 35, which is preferably of magnetic material, and is held thereon by magnetic attraction. Any desired toy figure, such as the toy figure 51, shown in Figure 3, is engaged in the resilient clamping channel 50, so that the figure 51 rotates with the platform 35.

Referring now to the form of the invention shown in Figures 6, 7 and 8, the circular base member, shown at 17' is formed with the central upstanding shaft element 18' having the reduced upper portion 19' formed with the annular groove 20'. Base member 17' is preferably provided on its bottom surface with a suitable frictional coating 21' of abrasive material, adapted to frictionally engage the top surface of a phonograph record 45 adjacent the spindle opening of said record which receives the phonograph spindle 13. A cylindrical housing 27' is coaxially arranged over the base member 17'. A plurality of friction wheels 22', spaced on evenly spaced radial axes are arranged around the shaft 18', said rollers 22' rotatably mounted on respective radial shafts 23' secured in and projecting radially from an annular ring 24' engaged around the vertical shaft 18', as shown in Figure 7.

The ring member 24' is freely rotatable on the upstanding shaft 18', and the friction wheels 22' engage the base member 17' with rolling contact. Said friction wheels 22' have cylindrical bearing sleeve portions 25' which are formed at their outer ends with conical friction surfaces 26'. Designated at 28' is an annular, drum-like friction wheel of substantial diameter having a depending annular flange 29' formed at its bottom end with the conical friction surface 30' which is supported on and frictionally engages the conical surface 26' of the bearing sleeve 25'. The member 28' is centrally formed with the upstanding hollow post 30' which rotatably receives the reduced upper single portion 19' and which is provided with a radially extending screw 31' threadedly engaged through the wall thereof and extending into the annular groove 20' to retain member 28' in the position thereof shown in Figure 7.

Rigidly secured to the top end of the hollow post member 30' is the circular top platform 32' adapted to support toy figures, as in the previously described form of the invention, said platform 32' preferably being formed of magnetic material.

Extending through an aperture 33' in the cylindrical housing element 27' is a rod 34' which is threadedly engaged in the ring 24' and which extends radially outwardly from the element 27'. The rod member 34' is provided at its outer end with any suitable means, for example, with a U-shaped clamping member such as the clamping member 34, adapted to clampingly engage with the phonograph arm pivot post of the phonograph to hold housing member 27' stationary while the phonograph turntable and the record 45 rotate. As will be readily apparent from Figure 7, rotation of the record 45 is transmitted to base member 17' and through the friction wheels 22' to the member 28' and platform 32' which rotate at a substantially reduced rate as compared with the rate of rotation of the record 45. Thus, the toy figures supported on platform 32' move around the axis of the phonograph turntable at a regular speed, although at a much slower rate of speed than the record. The movement of the toy figures associates itself with the audible material provided by the record, which greatly enhances the entertainment and the educational value of such material, especially to children.

As shown in Figure 8, ring member 24' is rigidly held with respect to housing element 27' by the rod member 34' and by a pair of radially extending fastening bolts 55', 55' engaged through the cylindrical housing element 27' and threadedly engaged in the ring member 24'.

While certain specific embodiments of an improved entertainment and educational attachment for a phonograph have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

An entertainment and educational attachment for a phonograph of the type having a rotatable turntable provided with a disc centering spindle, a phonograph arm pivot post and a phonograph arm pivotally mounted on said pivot post, comprising a base member engageable around the turntable spindle of the phonograph in axial alignment therewith, means on the bottom of the base member frictionally and drivingly engageable with a phonograph disc record on the turntable, a plate-like body disposed above said base member and adapted to support toy figures thereon, a housing element disposed between said base member and said plate-like body, means rotatably supporting said housing element on said base member, a depending annular flange member rigidly secured to said plate-like body substantially coaxially with said base member, horizontal shaft means in said housing element, a friction wheel on said horizontal shaft means, said friction wheel having a relatively large diameter inner end portion drivingly engaging said base member and a relatively small-diameter outer end portion drivingly engaging said annular flange member and transmitting rotation from the base member to the plate-like body at a reduced rate, an outwardly projecting rod member rigidly secured to said housing element, and a U-shaped spring clip on the end of said rod member formed and arranged to clampingly engage the phonograph arm pivot post to hold the housing element against rotation while the turntable is rotating.

References Cited in the file of this patent

UNITED STATES PATENTS

| | | |
|---|---|---|
| 176,590 | Brigham | Apr. 25, 1876 |
| 1,131,895 | Balcke | Mar. 16, 1915 |
| 1,417,061 | Hansley | May 23, 1922 |
| 1,451,805 | Balcke | Apr. 17, 1923 |
| 1,475,222 | Converse | Nov. 27, 1923 |
| 1,544,645 | Johnson | July 7, 1925 |
| 2,368,805 | Clark | Feb. 6, 1945 |
| 2,457,460 | Goodale | Dec. 28, 1948 |
| 2,499,646 | Horn et al. | Mar. 7, 1950 |